United States Patent
Stubbs

[11] 3,866,644
[45] Feb. 18, 1975

[54] WORK TABLE FOR FABRICATING PANEL STRUCTURES

[76] Inventor: Mayo P. Stubbs, P.O. Box 131, Colorado City, Ariz. 86021

[22] Filed: Apr. 2, 1973

[21] Appl. No.: 346,968

[52] U.S. Cl. .......... 144/288 C, 269/307, 269/321 F
[51] Int. Cl. ......... B25h 1/02, B25h 1/20, B25h 7/00
[58] Field of Search ........ 269/37, 40, 41, 43, 321 F, 269/321 S, 289, , 307; 144/288 R, 288 C; 227/152, 154; 29/200 R, 200 P, 200 J, 407

[56] References Cited
UNITED STATES PATENTS

| | | | |
|---|---|---|---|
| 2,305,124 | 12/1942 | Wilson, Jr. et al. | 144/288 R |
| 2,754,862 | 7/1956 | Kemp, Jr. | 269/321 F |
| 2,822,841 | 2/1958 | Huffman | 269/321 F |

*Primary Examiner*—Roy Lake
*Assistant Examiner*—Neil Abrams
*Attorney, Agent, or Firm*—Mallinckrodt & Mallinckrodt

[57] ABSTRACT

A work table presenting a horizontal work area upon which a panel structure that includes an internal framework is fabricated, has changeable templates extending along the work area, guides for positioning top and bottom plates of the wall structure in correct position, and jig members extending along mutually opposite sides of the table. The changeable templates indicate correct positions for placing framework elements that connect the top and bottom plates of the wall structure. The jig members have a plurality of marks along their lengths registering with proper positions for the respective framework elements. When panels are placed on the framework, they obscure the frame elements; but the marks on the jig members indicate correct positions for nailing the panels to the framework. In using the table pursuant to the method of the invention, a template corresponding to the type of wall structure to be fabricated is positioned on the work area, top and bottom plates are positioned along mutually opposite sides of the work area, other framework elements, e.g., studs, are placed between the top and bottom plates in positions along the table indicated by the template, the top and bottom plates are nailed to such other framework elements while maintaining them in fixed positions on the work table. Panels are placed on the resulting framework, and the panels are nailed to the framework using the jig members to determined where to drive the nails.

9 Claims, 6 Drawing Figures

WORK TABLE FOR FABRICATING PANEL STRUCTURES

BACKGROUND OF THE INVENTION

1. Field

The invention is directed to apparatus and methods for prefabricating wall structures.

2. State of the Art

Prefabricated framework walls have customarily been produced by laying the elements of the framework out on a table or on the floor using a tape measure. Such a process is time consuming. Manually positioning of the framework elements using a tape measure results in the production of many non-usable structures and poor uniformity from one wall section to another.

If the prefabricated framework is to also have dry-wall, paneling or other wallboard material attached thereto, it has been customary to stand the framework in a vertical position and nail individual pieces of wall covering to the framework. Where the wall covering was large enough to obscure a large portion of the framework, marks were made on the wall covering to indicate positions of the framework underneath whereby nails could be driven through the wall covering into the underlying frame. Such manual measurement is time consuming and susceptible of incorrect measurement resulting in poor quality wall sections.

SUMMARY OF THE INVENTION

In accordance with the present invention, a work table is provided upon which high quality panel structures having an internal framework are efficiently fabricated. A method of rapidly fabricating high quality, uniform panel structures is disclosed in conjunction with the unique work table.

The work table comprises a horizontal work area having changeable templates extending along the work area. The templates have a series of marks extending lengthwise thereof, each mark indicating a particular type of framework element and the position thereof on the work area. Means are provided for positioning the top and bottom plate members of the framework structure on the work area in correct structural relationship to each other. In a preferred embodiment, such means are provided by raised sections extending along the sides of the work area. The raised sections act as stops in positioning the top and bottom plate members on the work area, i.e., each plate member is positioned on the work area with one side thereof in contact with its respective raised section on the sides of the work area and with an end of each plate member in contact with the raised section at the end of the work area. The raised section extending along the end of the work area is likewise used to position the end framework element on the work area. The end element is placed with one side thereof in contact with the raised section at the end of the work area and its two ends in contact respectively with the top and bottom plate members.

Latches can be located on the surface of the work area along the raised sections to hold the top plate, bottom plate, and end stud or element securely in place, and thus, maintain the plate members in square relationship with the end stud or element. The remaining framework elements are positioned parallel to the end stud or element at positions along the length of the work area corresponding to the markings on the template. The markings on the template indicate both the particular type of framework element as well as the position of each particular element on the work area.

After the framework elements have been positioned on the work area, they are nailed or otherwise attached to the top and bottom plates to form an integral structure. Panel members are then placed on the framework structure. For the purposes of this invention, the term panel members is meant to include any wall board material such as dry-wall, plywood sections, wood paneling, or siding.

Elongate jig members extend along at least two mutually opposite edges of the work area. The jig members have a series of marks extending lengthwise thereof with individual marks corresponding to the positions of respective framework elements underlying the panel members. The marks on the jig members are used to indicate correct locations for nailing the panel members to the underlying framework.

In a preferred embodiment of a work table according to the present invention, elongate boards or plank like members extend longitudinally along the entire length of the sides of the work table. The elongate boards or plank like members are attached to the ends of the work table by extension arms which pivot about a longitudinal axis through the end of the work table. The elongate members, one on each side of the table, are rotatable from a position along the sides and below the surface of the work table to a position along and above the surface of the work table. These rotatable, elongate members are used as shields during the fabrication of the framework. The framework elements and top and bottom plates are attached to each other by nailing using a power-driven nailing device. Such devices can inflict serious damage to the operator thereof or other workmen in the vicinity of the table when, for some reason or another, the nail being driven varies off course in the plate members and misses the framework element positioned behind the plate members. The rotatable, elongate members, when in their positions along and above the surface of said work area, act as a shield against such off-course nails. The operator grasps the framework member by reaching over and behind the elongate member. Any off-course nail hits the elongate member preventing injury to the operator's hand and arm.

The rotatable elongate members are also useful in fabricating a staggered stud wall. Staggered stud walls have top and bottom plates wider than the width of the framework elements. The framework elements are staggered, i.e., one being flush with one side and the next flush with the opposite side of the top and bottom plates. In fabricating such a wall on the table of this invention, the group of studs which are to be flush with the sides of the plate members facing the table surface are placed on the table and positioned according to the predetermined marks on the changeable template. These studs are nailed to the top and bottom plates. The studs which are to be flush with the upper sides of the plate members are then placed one between each of the attached studs. The rotatable, elongate members along each side of the table are then rotated to a position above the end portion of the studs. The lower edges of the elongate members are positioned above the studs at a height equivalent to that of the top and bottom plate. The elongate members have marks along the length thereof which are used for positioning the loose studs between the fixed studs. The end of each loose stud is raised in its correct position between the fixed studs, until the top of the stud makes contact with the bottom edge of the elongate members. The raised stud is then nailed to the plate member. After each of the loose studs have been accordingly attached to the top and bottom plates, the elongated members are rotated back to their position along the side and below the surface of said table.

The work table of the present invention can also be used in combination with elongate guide members which extend transversely across the table adjacent the ends of the framework structure. The guide members have a plurality of marks along their length which can be used for applying overlapping siding to the framework. The first siding member is positioned with its bottom side in line with the lower-most marks on the guide members and succeeding siding members are placed that their bottom sides overlap the upper edge of the preceeding siding member with the appropriate marks on the elongate guide members.

The present invention also encompasses a method of fabricating wall sections of framework type using a work table as described hereinbefore. The parallel stud members and top and bottom plates of the wall section are placed on the work table in wall-frame relationship to one another as determined by the changeable templates located on the work table. The studding members are attached to the top and bottom plates while maintaining them in fixed position on the work table. Panel members are then layed on the framework and elongate jig members are positioned along the top and bottom plates of the framework. The jig members have a series of predetermined points extending lengthwise thereof with individual points on the jig members being in line with the corresponding studding member of the frame. The panels are then nailed to the framework structure using the predetermined points in the jig member as a guide for determining where to drive the nail through the panel members so that the nails extend into a framework element underlying the panel members. If the framework is to have overlapping siding applied thereon, elongated guide members are placed along the ends of the nailed frame. The guide members have a plurality of marks along their lengths. The bottommost siding member is placed on the wall structure with its bottom side in line with the lowermost markings on the elongate guide members, and subsequent siding members are then placed on the wall structure with their lowermost sides overlapping the uppermost side in line with the appropriate markings on the elongated guide members.

THE DRAWINGS

The device illustrated in the accompanying drawings represents the best mode presently contemplated of carrying out the invention, although it is recognized that the inventive concepts here taught can be utilized in a variety of specific forms within the scope of the claims.

DETAILED DESCRIPTION OF THE PREFERRED EMBODIMENTS

The work table illustrated in FIGS. 1–5 comprises an elongate, horizontal work area 10 supported by superstructure elements 12 and legs 11.

Figure 1:
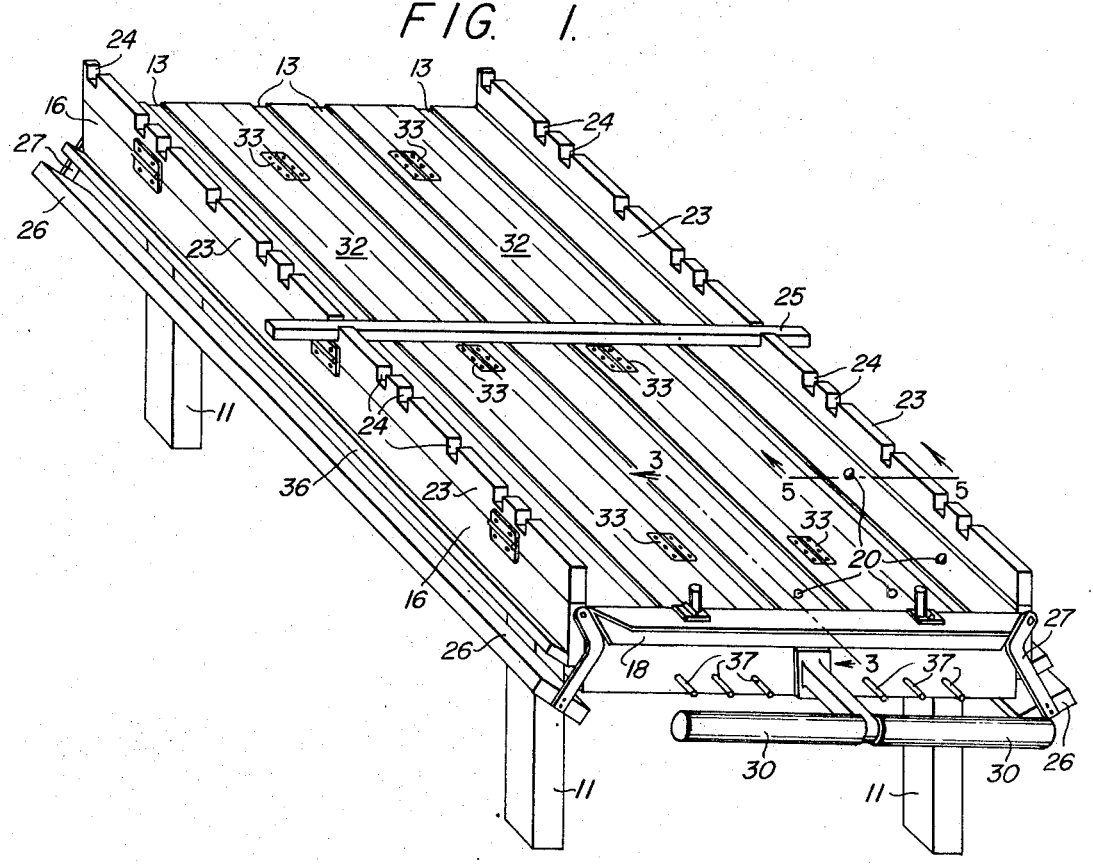
FIG. 1 is a perspective view of a work table according to this invention.
Figure 2:
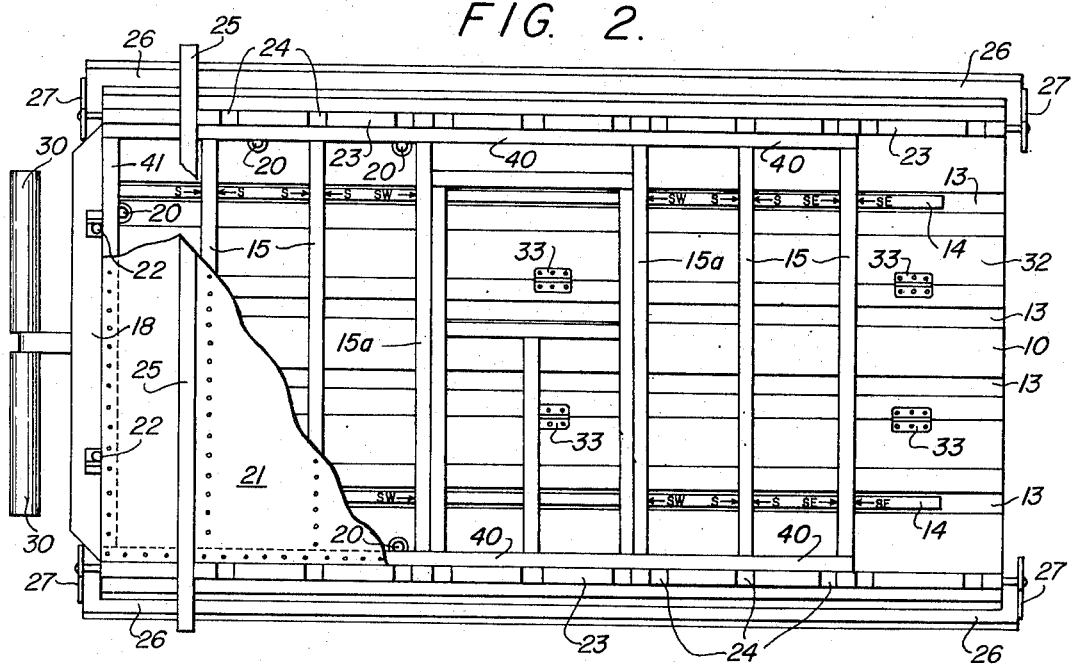
FIG. 2 is a top view of the table of FIG. 1.
Figure 3:
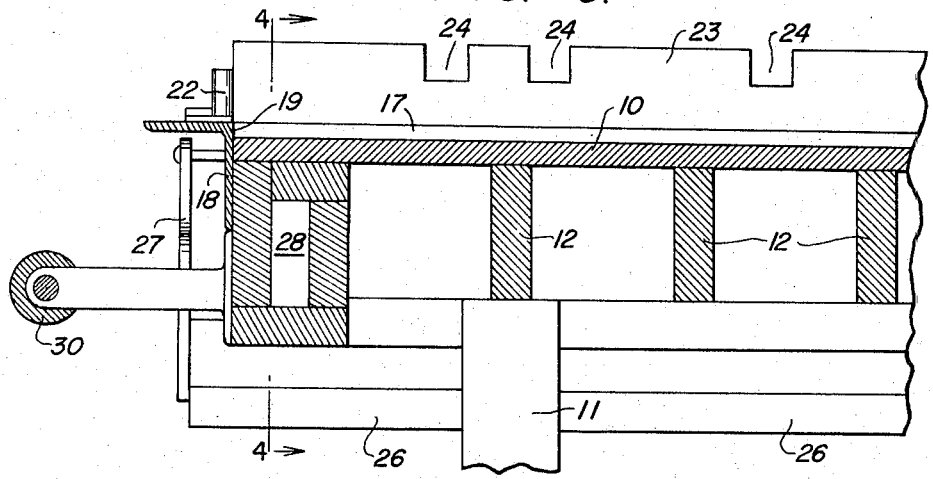
FIG. 3 is a fragmentary, cross-sectional side view taken along line 3—3 in FIG. 1.

The table has changeable template means extending longitudinally along the surface of the work area 10. As illustrated, the table has four slots 13 extending longitudinally in the surface of work area 10. The slots 13 are spaced in the transverse direction so that the two outermost slots 13 are in the vicinity of the longitudinal sides of the work area 10 and the two innermost slots 13 are in the vicinity of and one on each side of the longitudinal axis of the table. Elongate template members 14, shown in FIG. 2, are positioned in the elongate slots 13. The elongate template members 14 have a series of marks extending lengthwise thereof, with each mark indicating a particular type of framework element, such as single studs 15 and window unit 15(a) shown in FIG. 2, and the position of each framework element on work surface 10. The template members 14 are changeable so that a variety of wall sections can be fabricated on the table. Each type of wall section has its corresponding template members 14 to be positioned in slots 13. In FIG. 2, there is illustrated a full width wall section having a window frame therein. The template members 14 are placed in the outermost slots 13 when a full width wall structure is being fabricated. For wall structures having widths less than the width of the table, the templates corresponding to such a wall structure are placed one in either of the outermost slots 13 and the other in one of the innermost slots 13 depending upon the width of the wall structure.

Figure 4:
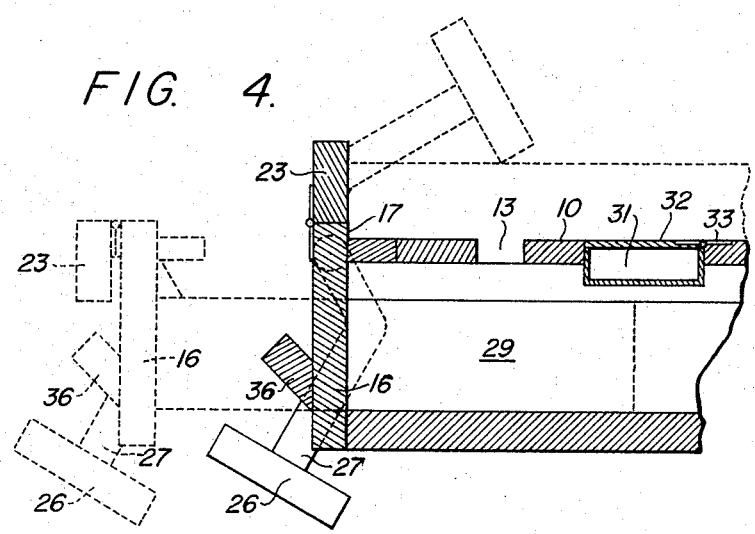
FIG. 4 is a fragmentary, cross-sectional end view taken along line 4—4 of FIG. 3.
Figure 5:
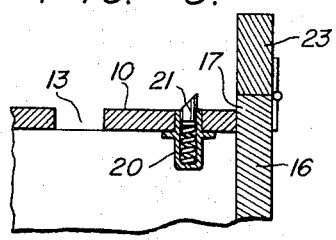
FIG. 5 is a fragmentary, sectional view taken along line 5—5 of FIG. 3.

Means are provided for positioning the top and bottom plate members 40 and the end element 41 of the wall structure on the work table in their correct wall frame relationship to each other. A preferred means for positioning the top and bottom plate members 40 on the work area comprises raised sections extending along the sides of the work area. The raised sections act as stops in positioning the plate members on the table. As shown in FIGS. 4 and 5, the raised sections 17 can be formed by extensions of the side members 16 beyond the surface of work area 10. In using the raised sections 17 as stops in positioning the top and bottom plate members 40 in proper parallel configuration on the work table, the plate members 40 are placed on the work table adjacent the sides of the table respectively, with a side of each plate member in contact with the respective raised sections 17 on the side of the table.

As illustrated, the table has an angle iron member 18 positioned along one end thereof. The angle iron member 18 extends upwards beyond the surface of work area 10 forming a raised section 19 at the end of the table. The raised section 19 is used in combination with raised sections 17 on the sides of the table in positioning the top and bottom plates 40. In addition, the raised section 19 is used to position the end stud or framework element 41 in proper perpendicular relationship between the respective ends of the top and bottom plates 40. The top and bottom plate members 40, which are positioned a proper distance from each other and in parallel relationship when in contact with the raised sections 17 on the sides of the table, are moved along the raised sections 17 maintaining contact therewith so that the end of each plate member makes contact with the raised section 19 at the end of the table. The end stud or framework member 41 is then placed on the work table with one side thereof in contact with the raised section 19 and with its ends abutting the top and bottom plate members 40 respectively. The top and bottom plate members 40 are in proper square relationship with the end stud or framework element 41 when the three members 41 are so positioned on the work table.

Latch members 20 can be located in the surface of the work area 10 along raised sections 17 and 19 to hold the top and bottom members 40 and end stud or element 41 securely in their proper positions on the work table, thus, maintaining the square relationship between the plate members 40 and the end stud or element 41 until the remaining framework elements have been positioned on the table and the framework nailed together as an integral unit. The latch members 20 can be simple spring actuated latches situated in the surface of the work area 10 as shown in FIG. 5. The barrel 21 of the latch member 20 has an inclined side facing the center portions of the work area 10 and a perpendicular side facing raised sections 17 and 19. As the plate members 40 and the end stud or framework element 41 are placed on the table and moved towards the sides or end of the table respectively, they contact the inclined sides of the barrels 21 of latch members 20. The barrels 21 receed into the surface of the work area 10 allowing the plate members 40 and end stud or framework element 41 to move over the latch members 20 towards the respective sides of the table. The latch members 20 are positioned at a distance from the sides of the table so that when the plate members 40 and the end stud or framework element 41 make contact with the raised sections 17 and 19 respectively, the barrels 21 of the latch members 20 are released and extend up along the sides of the plate members 40 and the end stud or framework element 41 facing the conter of the table, thereby holding the plate members 40 and end stud or framework element 41 in position along the respective raised sections on the sides and end of the table.

The latches 20 hold the plate members 40 and the end stud or framework element 41 in correct, square relationship as the remaining framework elements are positioned on the table. The remaining framework elements are positioned parallel to the end framework element 41 at positions along the length of the work table as indicated by the marks on the template. The ends of each of the remaining framework elements abuts against the top and bottom plate members 40 respectively. The template also indicates the correct type of framework element for each position along the length of the work table. FIG. 2 shows a top view of the work table showing a wall structure in the process of being fabricated thereon. The template members 14 are positioned in the two outermost slots 13. The template members 14 indicate the correct type of framework elements and the position of each element on the work table by the markings on the templates. For the wall structure shown in FIG. 2, the templates are shown with the markings S → ← S indicating a stud and its position, SW → ← SW indicating a standard, single window unit and its position and SE → ←SE indicating end stud and its position. An infinite number of symbols could be used to denote the specific type framework element and its position, and the particular symbols do not form a part of the present invention nor is the present invention to be limited in any way by the symbols shown herein.

When all of the framework elements have been positioned in the work area, they are nailed or otherwise attached to the top and bottom plates 40 to form an integral frame structure. Panel members 21, shown broken away in FIG. 2, are then placed on the framework structure. Stop members 22, which are hingedly attached to the angle iron 18 can be rotated from a position parallel to the angle iron 18, to a position extending vertically upward from the angle iron 18. The stop members 22, in their upward position; extend beyond the upper surface of the framework elements and the panel members 21 are easily positioned on the end of the table by butting their edges with the stop members 22.

Elongate jig members 23 extend along the longitudinal sides of the table and are hingedly attached to the side members 16 at the extended portions 17 thereof. The jig members 23 are rotatable from a position extending downward and parallel the sides of the table, to a position extending vertically upward from the raised sections 17 of side members 16. The jig members 23 have two functions. First, they extend above the upper surface of the framework structure on the table and can be used as stops for positioning the panel members on the framework structure. Secondly, the elongated jig members 23 have a series of marks shown in the drawings as recessed sections 24, extending lengthwise thereof, with mutual pairs of recessed sections 24 corresponding to the positions of respective framework elements underlying the panel members. The recessed sections 24 of jig members 23 are used to indicate the positions of the framework elements underlying the panel members when nailing the panel members to the framework structure. Mutual pairs of recessed sections 24 on jig members 23 establish imaginary lines across the table and the panel members are nailed to the framework structure along these lines. Preferably, a straight edge member 25 is placed from one jig member to the other and moved along the jig members 23 to register with mutual pairs of recesses 24. Nails are driven in the panel sections along a line adjacent to the straightedge member 25 for each of the pairs of mutual recesses 24 in jig members 23.

Elongate boards 26 extend longitudinally along the length of the sides of the work table. The boards 26 are attached to the ends of the work table by extension arms 27 which pivot about longitudinal axes through the end of the work table. The boards 26, one on each side of the table, rotate from a position along the sides and below the surface of the work table, to a position along and above the surface of the work area 10, as shown in FIG. 4. The boards 26 are used as shields and guide members for making staggered stud walls as fully explained hereinabove.

Means are provided on the illustrated table for extending at least one side of the table in a direction transverse to the longitudinal axis of the table, thereby increasing the width of the work area on the table. In the means shown in the drawings, the superstructure at one end or both ends of the table is formed into a block 27 having a rectangular opening 28. A support board 29 is slidably positioned in the opening 28 and the side member 16 of the table regidly affixed to the support board 29. The side of the table can be extended by pulling the side away as shown in phantom in FIG. 4. Further, with the table illustrated, one end of the side can be extended without extending the other end, and wall structures having an inclined side can then be fabricated on the table.

The table also includes arms 30 to hold rolls of tar paper. The tar paper can be withdrawn from the rolls and affixed to the wall structures on the table when desired.

The illustrated table also has recessed areas 31 in said work area 10 having a cover 32 attached to the work area 10 by hinges 33. Trays of changeable templates can be stores out of the way in recesses 31.

Figure 6:
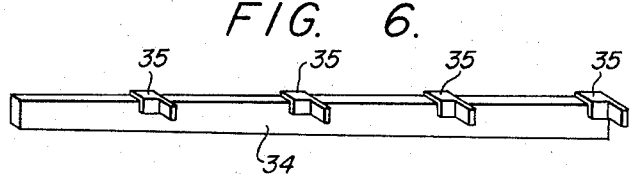
FIG. 6 is a perspective view of a guide member used in combination with the table of this invention.

When overlapping siding is to be applied to the framework structure, guide members 34, as shown in FIG. 6, are used in combination with the work table. The guide member 34 has a plurality of marks, or as shown in FIG. 6 protrusions 35, along the length thereof. A guide member is positioned at each end of the framework structure on the table. The first siding member is positioned with its bottom side in line with the lowermost pair of mutual protrusions on the guide members. Succeeding siding members are placed so that their bottom sides overlap the upper edge of the preceeding siding member, and so that the bottom sides of the succeeding siding members are in line with the succeeding pairs of protrusions on the guide members 34.

The table can also have a tray 36 running longitudinally along the side member 16 to hold nails and other implements used in fabricating the framework structure. Rolls of nails used in modern pneumatic nailing machines can also be hung on hangers 37 located along the ends or sides of the table.

In describing the work table of this invention reference was made to the fabrication of a wall structure. For the purposes of this invention, the term wall structure is meant to include any panel structure having an internal frame. Further, whereas this invention is here described and illustrated with respect to certain forms thereof, it is to be understood that many variations are possible.

I claim:

1. A work table for use in fabricating panel structures having an internal framework covered by panels, said table comprising a horizontal work area having changeable template means extending therealong; means for positioning top and bottom plate members of said framework on the work area in correct structural relationship to each other said positioning means comprising raised sections extending along the longitudinal sides and one end of said work area, said top and bottom plate members being positioned by placing the sides thereof in contact with the raised sections on the sides of said work area and the respective ends thereof in contact with the raised section on the end of said work area; and elongate jig members extending along at least two mutually opposite edges of the work area, said template means having a series of marks spaced along the length thereof, each mark indicating a particular type of framework element and the position thereof on the work area, said jig members having a series of marks spaced along the length thereof, the individual marks corresponding to correct positions of respective framework elements in said panel to thereby indicate correct locations for nailing the panels to the framework, and said jig members being attached to the sides of said raised sections by hinges whereby said jig members can be rotated from a retracted position extending downward along the sides of said sections to a position extending vertically upward from said raised sections.

2. A work table as claimed in claim 1 wherein the template means are elongate members positioned in elongate slots running longitudinal of said work area.

3. A work table as claimed in claim 1 wherein said raised section extending along one end of said work area has elongated members hingedly attached thereto whereby said elongated members can be rotated from a position parallel to said raised section to a position extending vertically upward from said raised section, said elongated members forming stops for positioning said panel members on said framework.

4. A work table as claimed in claim 1 including a plurality of depressible latch members positioned along the longitudinal sides and one end of said work area, means of depressing said latch members into said work area thereby allowing said top plate, bottom plate, and end element to be moved along the surface of said work area into contact with their respective raised sections, and means for releasing said latch members when said plates and end element are in contact with their respective raised sections, said latch members being located such that when they are released, they extend from said work area adjacent the sides of said plates and end element mutually opposite the sides which are in contact with the raised sections thereby holding said plates and end element securely in contact with the raised sections.

5. A work table as claimed in claim 1 wherein elongate members extend along the longitudinal sides of said work area and are attached to the ends of said table so that said elongate members can rotate from a position along said sides and below the surface of said work area to a position along and above said surface of said work area.

6. A work table as claimed in claim 1 including means for extending at least one of the longitudinal sides of said work table in a direction transverse to the longitudinal axis of said table thereby increasing the width of said work area.

7. A work table as claimed in claim 1 wherein means are provided for mounting rolls of tar paper at one of the ends of said table whereby tar paper can be withdrawn from said rolls and affixed to said wall structure on said table.

8. A work table as claimed in claim 1 wherein said work surface has elongated cut-out sections therein for receiving trays of elongated template members.

9. A work table as claimed in claim 1 in combination with elongate guide members extending transversely across said table adjacent the ends of said framework, said guide members having a series of guide elements along their lengths for applying overlapping siding to said framework.

* * * * *